United States Patent
Ejiri et al.

(10) Patent No.: US 9,995,322 B2
(45) Date of Patent: Jun. 12, 2018

(54) MULTISTAGE PISTON ACTUATOR

(71) Applicants: FUJIKURA RUBBER LTD., Koto-ku, Tokyo (JP); FUJIKIN INCORPORATED, Osaka-shi, Osaka (JP)

(72) Inventors: Takashi Ejiri, Tokyo (JP); Tomohiro Nakata, Osaka (JP); Tadayuki Yakushijin, Nishi-ku (JP)

(73) Assignees: FUJIKURA RUBBER LTD., Tokyo (JP); Fujikin Incorporated, Osaka (JP)

( * ) Notice: Subject to any disclaimer, the term of this patent is extended or adjusted under 35 U.S.C. 154(b) by 0 days. days.

(21) Appl. No.: 15/516,849

(22) PCT Filed: Oct. 7, 2014

(86) PCT No.: PCT/JP2014/076810
§ 371 (c)(1),
(2) Date: Apr. 4, 2017

(87) PCT Pub. No.: WO2016/056066
PCT Pub. Date: Apr. 14, 2016

(65) Prior Publication Data
US 2017/0292542 A1    Oct. 12, 2017

(51) Int. Cl.
*F15B 15/14*    (2006.01)
*F16K 31/122*   (2006.01)
(Continued)

(52) U.S. Cl.
CPC ...... *F15B 15/1423* (2013.01); *F15B 15/1428* (2013.01); *F15B 15/1471* (2013.01);
(Continued)

(58) Field of Classification Search
CPC ...... F16H 41/04; F16H 41/24; F15B 15/1423; F15B 15/1428; F15B 15/1471
See application file for complete search history.

(56) References Cited

U.S. PATENT DOCUMENTS 6,357,339 B1    3/2002    Ejiri

FOREIGN PATENT DOCUMENTS

JP    H03-110278     11/1991
JP    11-325303 A    11/1999
(Continued)

OTHER PUBLICATIONS

International Search Report for Application No. PCT/JP2014/076810 dated Nov. 11, 2014.

*Primary Examiner* — F. Daniel Lopez
*Assistant Examiner* — Daniel Collins
(74) *Attorney, Agent, or Firm* — McCormick, Paulding & Huber LLP (57) ABSTRACT

A multistage piston actuator exerts a driving pressure against a spring pressure into pressure chambers of piston bodies, fitted into a cylinder body, to operate the push rod. Each piston body is combined with a partition fitted into the cylinder body. Each piston body includes a pressure receiving plate portion, and an axial rod and a slidable cylindrical guide portion extending concentrically in opposite directions, the axial rod having an axial air passage connected to the pressure chambers. Each partition includes a base plate portion having a through-hole which receives the axial rod of an adjacent piston body, a large-diameter outermost cylindrical portion fitted into the cylinder body, and a slidable cylindrical guide portion slidably fit-engaged with the slidable cylindrical guide portion of the piston body. The axial rods of each piston body are brought into contact to operate the push rod.

11 Claims, 5 Drawing Sheets

(51) Int. Cl.
*F16H 41/04* (2006.01)
*F16H 41/24* (2006.01)

(52) U.S. Cl.
CPC .. *F16K 31/1221* (2013.01); *F15B 2015/1495* (2013.01); *F16H 41/04* (2013.01); *F16H 41/24* (2013.01)

(56) References Cited

FOREIGN PATENT DOCUMENTS

| | | | |
|---|---|---|---|
| JP | 2000-283328 | A | 10/2000 |
| JP | 2001-027353 | A | 1/2001 |
| JP | 3300686 | B | 1/2001 |
| JP | 2009-002524 | A | 1/2009 |

Fig. 6B

MULTISTAGE PISTON ACTUATOR

CROSS-REFERENCE TO RELATED APPLICATION

This application is entitled to the benefit of and incorporates by reference subject matter disclosed in the International Patent Application No. PCT/JP2014/076810 filed on Oct. 7, 2014.

TECHNICAL FIELD

The present invention relates to a multistage piston actuator which is capable of obtaining different driving forces by increasing and decreasing the number of stages thereof.

BACKGROUND ART

For instance, normally open valves, which apply a spring force to a valve element in a valve opening direction, and normally closed valves, which apply a spring force in a valve closing direction, are known as on/off valves which open and close a flow passage. These types of valves are identical in operating principle in which the valve is closed or opened by applying air pressure in a direction against the spring force to the piston connected to the valve element.

As piston actuators for such types of on/off valves, multistage piston actuators in which cylinders each accommodating a piston body in a slidable manner are stacked in stages have been proposed Japanese Unexamined Patent Publication No. 2000-283328, Japanese Patent Publication No. 3,300,686, and Japanese Unexamined Patent Publication No. 2009-2524.

SUMMARY

However, the multistage piston actuator disclosed in each of these patent literatures is complicated in structure, the number of piston stages thereof is not easy to change, and it is difficult to reduce the size or axial length of the actuator.

Accordingly, it is an object of the present invention to obtain a multistage piston actuator which is simple in structure, and the number of piston stages of which is easy to change; furthermore, the actuator can be miniaturized and reduced in axial length, and a greater effective pressure-receiving area can be secured within a specified outer diameter.

The present invention is characterized by a multistage piston actuator, including a cylinder body, a plurality of piston bodies, which are fitted into the cylinder body, and a push rod. The multistage piston actuator exerts a driving pressure against a spring pressure into pressure chambers of the plurality of piston bodies to thereby operate the push rod. Each of the plurality of piston bodies is combined with a partition which is fitted into the cylinder body, the pressure chambers being formed between the piston bodies and the partitions, respectively. Each of the piston bodies includes a pressure receiving plate portion, and an axial rod and a slidable cylindrical guide portion which extend concentrically with an axis line in opposite directions from either side of the pressure receiving plate portion, the axial rod having an axial air passage that is communicably connected to the pressure chambers. Each of the partitions includes a base plate portion having a through-hole which receives the axial rod of an adjacent one of the piston bodies, and a large-diameter outermost cylindrical portion and a slidable cylindrical guide portion which extend concentrically with the axis line from one side of the base plate portion, the large-diameter outermost cylindrical portion being fitted into the cylinder body, and the slidable cylindrical guide portion being slidably fit-engaged with the slidable cylindrical guide portion of the piston body. The axial rods of the plurality of piston bodies are mutually brought into mechanical contact to thereby operate the push rod.

It is desirable for a large-diameter sealing member (O-ring) to be inserted in between an inner peripheral surface of the large-diameter outermost cylindrical portion and the base plate portion of the partition and the pressure receiving plate portion and an outer peripheral surface of the slidable cylindrical guide portion of the piston body; and for a small-diameter sealing member (O-ring) to be inserted in between an inner peripheral surface of the slidable cylindrical guide portion and the base plate portion of the partition and an outer peripheral surface of the axial rod of the piston body.

It is desirable for axial positions of the large-diameter sealing member (O-ring) and the small-diameter sealing member (O-ring) to overlap each other at least when the piston body and the partition are positioned close to each other.

It is desirable for the slidable cylindrical guide portion of each piston body to have a simple cylindrical shape, so that no groove having a U-shaped cross section for engaging the large-diameter sealing member (O-ring) is formed therein.

Similarly, it is desirable for the slidable cylindrical guide portion of the partition to have a simple cylindrical shape, so that no groove having a U-shaped cross section for engaging the small-diameter sealing member (O-ring) is formed therein.

Similarly, it is desirable for the axial rod of each piston body to have a simple rod shape, so that no groove having a U-shaped cross section for engaging the small-diameter sealing member (O-ring) is formed therein.

In an embodiment, a multistage piston actuator is provided, including a cylinder body, a plurality of piston bodies, which are fitted into the cylinder body, and a push rod. The multistage piston actuator exerts an operational pressure against a spring pressure into pressure chambers of the plurality of piston bodies to thereby operate the push rod. Each of the plurality of piston bodies is combined with a partition which is fitted into the cylinder body, the pressure chambers being formed between the piston bodies and the partitions, respectively. Each of the piston bodies includes a flat plate-shaped pressure receiving plate portion orthogonal to an axis line, and a simple rod-shaped axial rod and a simple cylinder-shaped slidable cylindrical guide portion which extend concentrically with the axis line in opposite directions from either side of the pressure receiving plate portion, the simple rod-shaped axial rod having an axial air passage that is communicably connected to the pressure chambers. Each the partitions includes a flat plate-shaped base plate portion that is orthogonal to the axis line and has a through-hole which receives the axial rod of an adjacent one of the piston bodies, and a large-diameter outermost cylindrical portion and a simple cylinder-shaped slidable cylindrical guide portion which extend concentrically with the axis line from one side of the base plate portion, the large-diameter outermost cylindrical portion being fitted into the cylinder body, and the simple cylinder-shaped slidable cylindrical guide portion being slidably fit-engaged with the slidable cylindrical guide portion of an associated piston body of the piston bodies. A large-diameter O-ring is inserted in an annular space formed between an inner peripheral surface of the large-diameter outermost cylindrical portion and the flat plate-shaped base plate portion of the partition and the flat plate-shaped pressure receiving plate portion and an outer peripheral surface of the slidable cylindrical guide portion of the associated piston body. A small-diameter O-ring is inserted in an annular space formed between an inner peripheral surface of the simple cylinder-shaped slidable cylindrical guide portion and the flat plate-shaped base plate portion of the partition and an outer peripheral surface of the simple rod-shaped axial rod of the piston body adjacent to the pressure receiving plate portion of the associated piston body. Axial positions of the large-diameter O-ring and the small-diameter O-ring overlap each other at least when the piston body and the partition are positioned close to each other. The axial rods of the plurality of piston bodies are mutually brought into mechanical contact to thereby operate the push rod.

In an embodiment, an on/off valve mechanism is provided, including the above-described multistage piston actuator according and an on/off valve which includes a valve body that is opened and closed via the push rod of the multistage piston actuator.

According to the present invention, a multistage piston actuator is achieved wherein the actuator is simple in structure and the number of piston stages is easy to change; furthermore, the actuator can be miniaturized and reduced in axial length, and a greater effective pressure-receiving area can be secured within a specified outer diameter.

DETAILED DESCRIPTION

Figure 1:
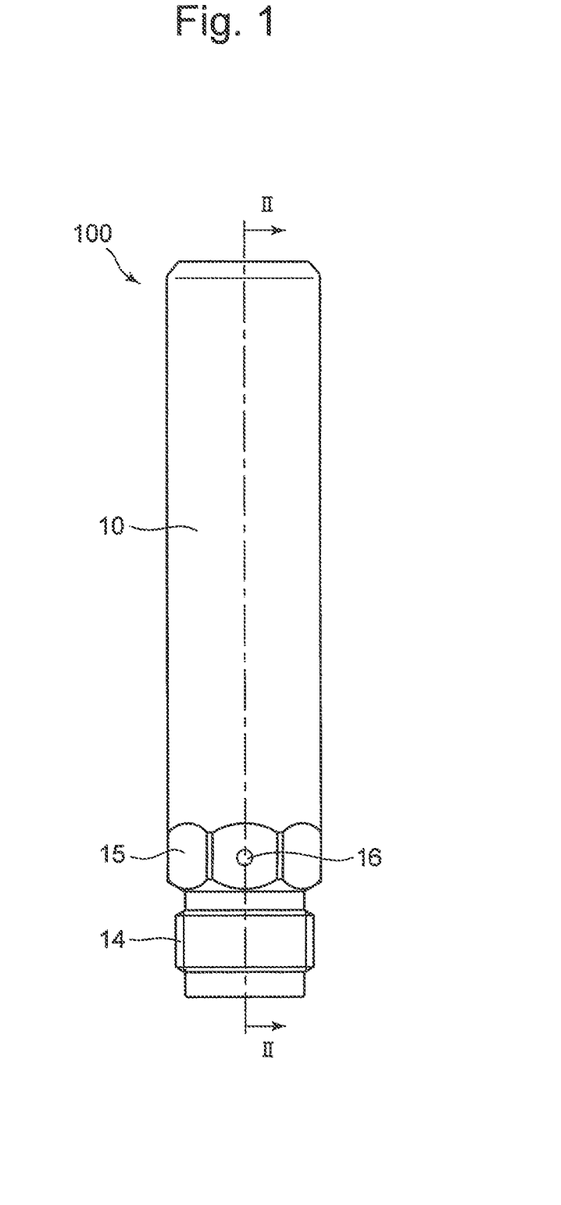
FIG. 1 is a front elevational view of an embodiment of a multistage piston actuator, according to the present invention
Figure 2:
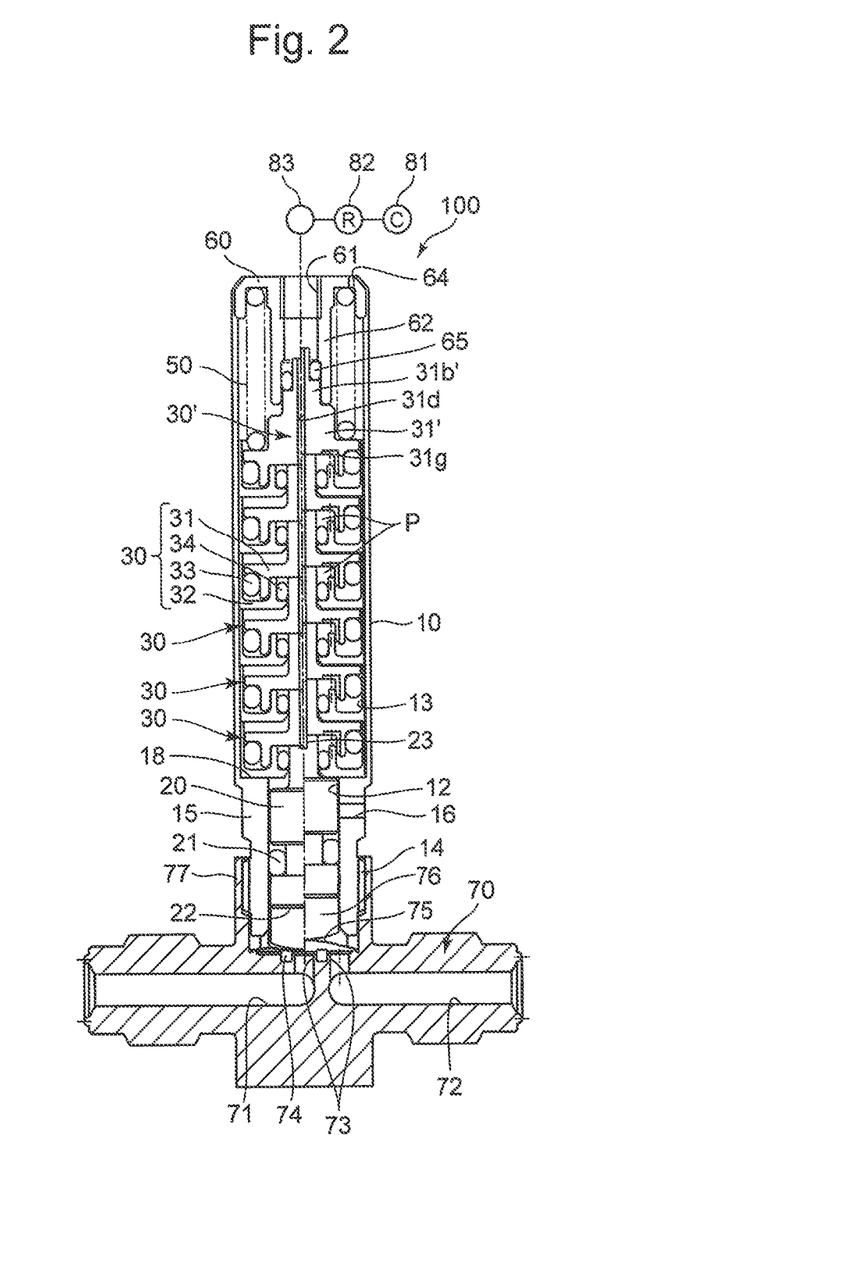
FIG. 2 is a sectional view taken along the line II-II of FIG. 1, illustrating a state where the multistage piston actuator shown in FIG. 1 is connected to a flow passage block to be used for the valve-opening driving.
Figure 3:
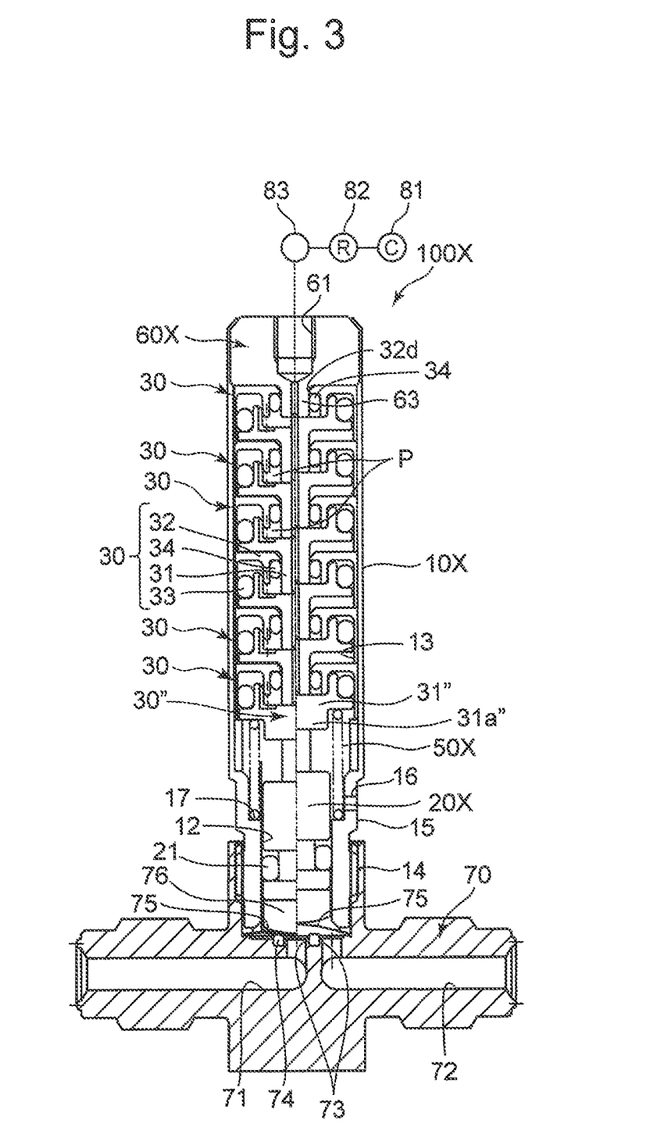
FIG. 3 is a sectional view corresponding to FIG. 2, illustrating an embodiment of a multistage piston actuator, according to the present invention, which is connected to the flow passage block to be used for the valve-closing driving of a normally open valve.

FIGS. 1 and 2 show an embodiment in which a normally closed type on/off valve is constructed using a multistage piston actuator according to the present invention, and FIG. 3 shows an embodiment in which a normally open type on/off valve is constructed using the same.

The multistage piston actuator 100 in FIGS. 1 and 2, which is a driving source for the normally closed type on/off valve, is provided with a metal (e.g., an aluminum alloy) cylinder body 10 and is provided with a metal push rod 20, multi-stacked (five stacked in the illustrated embodiment) piston assemblies 30, an irregular-shaped piston assembly 30', a valve closing spring 50 and a cap body (cover) 60, which are inserted into the cylinder body 10 in that order. The end of the cylinder body 10 is swaged and connected to the cap body 60 after the aforementioned elements are inserted.

A small constant diameter portion 12, into which the push rod 20 is slidably fitted, and a large constant diameter portion 13 into which the stacked piston assemblies 30 and the irregular-shaped piston assembly 30' are fitted, are formed in the cylinder body 10, and a male thread cylinder 14 and a hexagonal portion 15 are formed on the outer peripheral side of the small constant diameter portion 12. An exhaust hole 16 which extends in a radial direction is formed in the small constant diameter portion 12. The push rod 20 is provided on an outer peripheral surface thereof with an O-ring 21 which slidably contacts the inner surface of the small constant diameter portion 12 to maintain an airtight seal.

A flow passage block 70, to which the cylinder body 10 is connected, is provided with an inlet flow passage 71, an outlet flow passage 72, a diaphragm 75 and a pusher 76. The diaphragm 75 comes into and out of contact with a valve seat 74 provided in a communication passage 73 formed between the inlet flow passage 71 and the outlet flow passage 72, and the pusher 76 is positioned above the diaphragm 75. An actuator screw-engagement cylinder 77 which extends on the axis of the valve seat 74 and the diaphragm 75 is formed on the flow passage block 70. The male screw cylinder 14 is screw-engaged with the actuator screw-engagement cylinder 77 to be fixed thereto. One end of the push rod 20 constitutes a force application end 22 which faces (comes into and out of contact with) the pusher 76, and an air introduction groove 23 which extends in a radial direction is formed at the other end of the push rod 20.

Moving ends of the stacked piston assemblies 30 and the irregular-shaped piston assembly 30' which are inserted into the large constant diameter portion 13 of the cylinder body 10 are restricted at the position where the lowermost piston assembly 30 is in contact with a descending-extremity restricting step 18; in this state, the diaphragm 75 is pressed against the valve seat 74 via the push rod 20 and the pusher 76. Namely, a normally closed type on/off valve is constructed.

Whereas, a multistage piston actuator 100X, which is a driving source for a normally open type on/off valve, is provided with a metal (e.g., an aluminum alloy) cylinder body 10X and is provided with a metal push rod 20X, a valve opening spring 50X, an irregular-shaped piston assembly 30", multi-stacked (five stacked in the illustrated embodiment) piston assemblies 30 and a cap body (cover) 60X, which are inserted into the cylinder body 10X in that order. The end of the cylinder body 10X is swaged and connected to the cap body 60X after the aforementioned elements are inserted.

A small constant diameter portion 12, into which the push rod 20X is slidably fitted, a middle-diameter stepped portion 17 which forms a receiving seat for the valve opening spring 50X, and a large constant diameter portion 13, into which the irregular-shaped piston assembly 30" and the stacked piston assemblies 30 are slidably fitted, are formed in the cylinder body 10X. A male thread cylinder 14 and a hexagonal portion 15 are formed on the outer periphery of the small constant diameter portion 12, and the exhaust hole 16 is formed in the hexagonal portion 15.

Moving ends of the stacked piston assemblies 30 and the irregular-shaped piston assembly 30" which are inserted into the large constant diameter portion 13 of the cylinder body 10X are restricted at the position where the uppermost piston assembly 30 is in contact with the cap body 60X; in this state, no pressing force toward the valve seat 74 is exerted on the diaphragm 75. Namely, a normally open type on/off valve is constructed.

Figure 4:
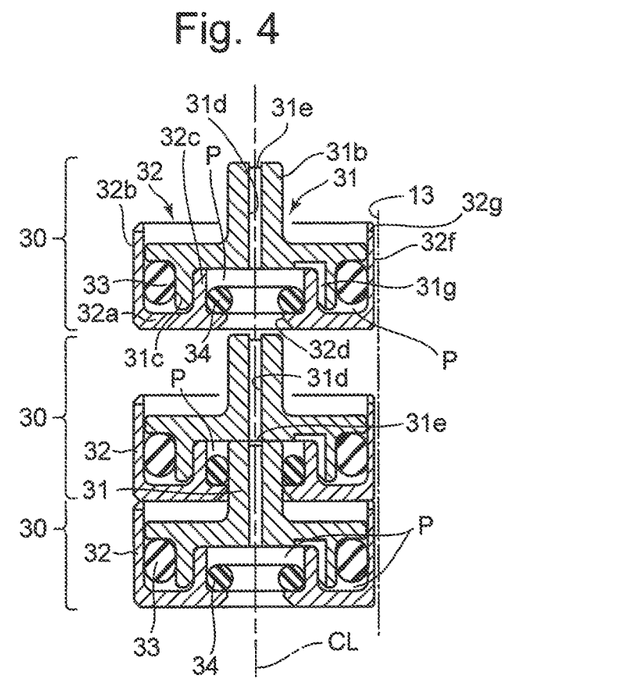
FIG. 4 is a longitudinal sectional view of three stacked piston assemblies which are removed from the multistage piston actuator shown in FIG. 2. In the multistage piston actuator shown in FIG. 3, the stacked piston assemblies of FIG. 4 are turned upside down.
Figure 5A:
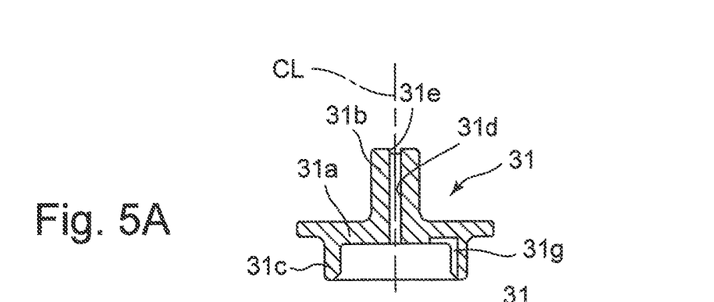
FIGS. 5A and 5B are a longitudinal sectional view and a base view of a single piston body of each of the stacked piston assemblies.
Figure 5B:
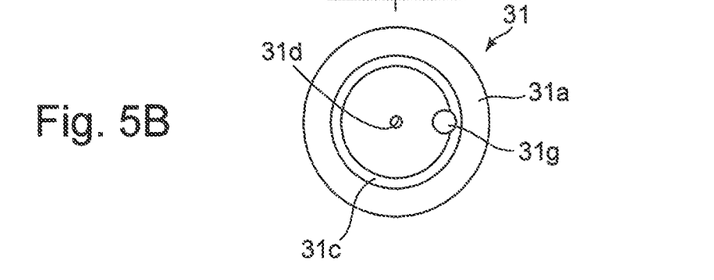
Figure 6A:
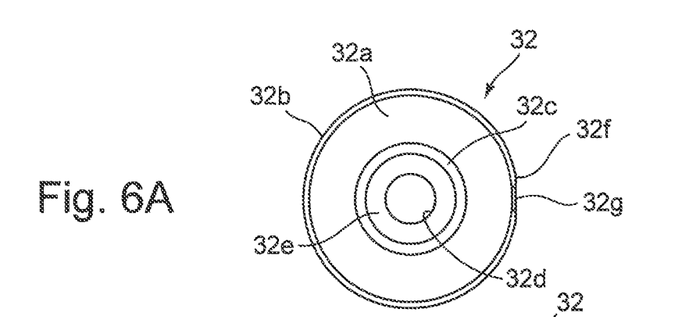
FIGS. 6A and 6B are a longitudinal sectional view and a base view of the partition alone of each of the stacked piston assemblies.
Figure 6B:
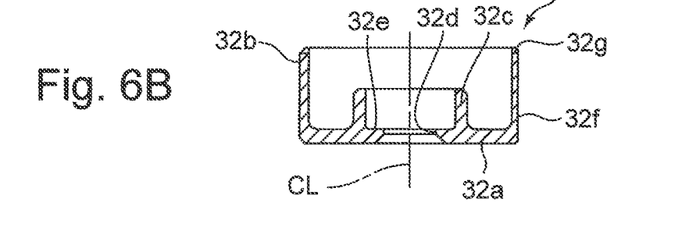

The details of the stacked piston assemblies 30, which are used in common between the above described multistage piston actuators 100 and 100X will be discussed with reference to FIGS. 4 through 6. The stacked piston assemblies 30 are each configured of a piston body 31 and a partition 32, the basic shapes of which are rotationally symmetrical about an axis line CL, and two small and large O-rings: a large-diameter O-ring 33 and a small-diameter O-ring 34. The piston body 31 is made of, e.g., metal (e.g., an aluminum alloy). The piston body 31, as shown by the single body shape thereof in FIG. 5, is provided with a pressure-receiving plate portion 31a which is orthogonal to the axis line CL, and an axial rod 31b and a slidable cylindrical guide portion 31c which extend concentrically with the axis line CL in opposite directions from either side of the pressure receiving plate portion 31a. An axial air passage 31d is formed through the axial rod 31b (and the pressure-receiving plate portion 31a). An air introduction groove 31e, via which the axial air passage 31d is communicatively connected to a radially outward side, is formed at the end of the axial rod 31b at the opposite side thereof from the pressure-receiving plate portion 31a.

The partition 32 is configured of, e.g., a molded product made of synthetic resin. The basic shape of the partition 32, as shown by the single body shape thereof in FIG. 6, is rotationally symmetrical about the axis line, similar to the piston body 31. The partition 32 is provided with a base plate portion 32a which is orthogonal to the axis line CL, a large-diameter outermost cylindrical portion 32b which extend concentrically with the axis line CL from one side of the pressure receiving plate portion 31a, and a small-diameter slidable cylindrical guide portion 32c. A through-hole 32d, which receives the axial rod 31b, is formed in the center of the base plate portion 32a, and an O-ring retaining edge 32e is formed around the through-hole 32d (the O-ring retaining edge 32e is part of the base plate portion 32a). The large-diameter outermost cylindrical portion 32b of the partition 32 is fitted into the large constant diameter portion 13 of the cylinder body 10(10X) with minimum clearance, a D-cut surface 32f is formed on a part of the peripheral surface of the large-diameter outermost cylindrical portion 32b, and an air vent groove 32g is formed at an end of the D-cut surface 32f.

The slidable cylindrical guide portion 31c of the piston body 31 and the slidable cylindrical guide portion 32c of the partition 32 are prevented from tilting relative to each other to play a role in ensuring coaxiality by being slidably fitted onto each other. An air introduction groove 31g which forms an air passage is formed on a portion of the piston body 31 at which the slidable cylindrical guide portion 31c of the piston body 31 and the slidable cylindrical guide portion 32c of the partition 32 slide on each other.

In the above described elements, the air introduction groove 31e and the air introduction groove 31g of the piston body 31 and the D-cut surface 32f and the air vent groove 32g of the partition 32 are not elements which are rotationally symmetrical in shape about the axis line of the piston body 31 and the partition 32.

The above described piston body 31 and partition 32 are assembled into one stacked piston assembly 30 with the large-diameter O-ring 33 inserted in between the inner peripheral surface of the large-diameter outermost cylindrical portion 32b and the base plate portion 32a of the partition 32 and the pressure receiving plate portion 31a and the outer peripheral surface of the slidable cylindrical guide portion 31c of the piston body 31, and with the small-diameter O-ring 34 inserted in between the inner peripheral surface of the slidable cylindrical guide portion 32c and the O-ring retaining edge 32e of the partition 32 and the outer peripheral surface of the axial rod 31b of an adjacent piston body 31. The closest approach positions of the piston body 31 and the partition 32 to each other are restricted by the end of the slidable cylindrical guide portion 32c of the partition 32 contacting the pressure receiving plate portion 31a of the piston body 31 (see FIG. 4, the left cross section of FIG. 2 and the right cross section of FIG. 3). The large-diameter O-ring 33 is larger, both in outer diameter about the axis line and cross-sectional diameter (wire diameter), than the small-diameter ring 34.

In this closest approach state, the axial-direction positions of the large-diameter O-ring 33 and the small-diameter O-ring 34 overlap each other, which reduces the axial length of each stacked piston assembly 30. In addition, the large-diameter O-ring 33 is inserted in between the inner peripheral surface of the large-diameter outermost cylindrical portion 32b of the partition 32, the outer peripheral surface of the slidable cylindrical guide portion 31c of the piston body 31 and the base plate portion 32a. Namely, a groove having a U-shaped cross section for retaining the large-diameter O-ring 31 is not formed on the piston body 31. In other words, the slidable cylindrical guide portion 31c of the piston body 31 has a simple cylindrical shape, so that no groove having a U-shaped cross section is formed thereon. Similarly, the small-diameter O-ring 34 is inserted in between the inner peripheral surface of the slidable cylindrical guide portion 32c and the O-ring retaining edge 32e of the partition 32 and the outer peripheral surface of the axial rod 31b of the piston body 31. Namely, a groove having a U-shaped cross section for retaining the small-diameter O-ring 34 is not formed on the partition 32. In other words, the slidable cylindrical guide portion 32c of the partition 32 has a simple cylindrical shape, so that no groove having a U-shaped cross section is formed thereon, and also the axial rod 31b of the piston body 31 has a simple rod shape, so that no groove having a U-shaped in cross section is formed thereon either. Hence, the axial length of each stacked piston assembly 30 has been reduced. In addition, since the large-diameter O-ring 33 and the small-diameter O-ring 34 are not fitted in grooves having a U-shaped cross section, the large-diameter O-ring 33 and the small-diameter O-ring 34 do not need to be increased in diameter (stretched) when installed, thus being superior in assembling workability. Additionally, with the above described stacked piston assemblies 30, not only miniaturization and reduction in the axial length can be achieved, but also a greater effective pressure-receiving area can be secured within a specified outer diameter.

In each of the above described stacked piston assemblies 30, the piston body 31 and the partition 32 are positioned to face upward and downward, respectively (the state of FIG. 4), in the normally closed type on/off valve shown in FIG. 2, and the partition 32 and the piston body 31 are positioned to face upward and downward, respectively (the upside down state of FIG. 4) in the normally open type on/off valve shown in FIG. 3.

The irregular-shaped piston body 31', of the irregular-shaped piston assembly 30' of the multistage piston actuator 100 that constitutes the normally closed type on/off valve shown in FIG. 2, is provided with an axial rod 31b' having a greater length than the axial rod 31*b* of the piston body 31; the axial rod 31*b*' is fitted into a guide cylinder 62 formed on the cap body 60. An O-ring 65, which keeps the space between the axial rod 31*b*' and the guide cylinder 62 airtight, is fitted onto the axial rod 31*b*'. An air vent hole 64 is formed in the cam body 60. In addition, an air introduction groove 31*g* that is similar to that formed on the piston body 31 is formed also in the irregular piston body 31'. The partition 32 which is combined with the irregular piston body 31' is identical to the partitions 32 of the stacked piston assemblies 30.

Additionally, the irregular-shaped piston body 31" of the irregular-shaped piston assembly 30" of the multistage piston actuator 100X that is shown in FIG. 3 is provided with neither the axial rod 31*b* nor the axial air passage 31*d*. A pressure-receiving plate portion 31*a*" is in contact directly with the push rod 20X. On the other hand, the cap body 60X is provided with a guide shaft 63 which is inserted into the through-hole 32*d* of the partition 32 of the stacked piston assembly 30 and the small-diameter O-ring 34. The air introduction groove 23 that is formed in the normally closed type push rod 20 of the multistage piston actuator 100 that is for the normally closed type on/off valve is not formed in the push rod 20X (does not need to be formed in the push rod 20X).

In the multistage piston actuator 100 shown in FIG. 2, the valve closing spring 50, which is positioned between the irregular-shaped piston assembly 30' and the cap body 60 as described above, biases the diaphragm 75 in the direction toward the valve seat 74 via the irregular-shaped piston assembly 30', the five stacked piston assemblies 30, the push rod 20 and the pusher 76 so that the communication passage 73, which is positioned between the inlet flow passage 71 and the outlet flow passage 72, is normally closed.

In the multistage piston actuator 100X shown in FIG. 3, the valve closing spring 50X, which is positioned between the irregular-shaped piston assembly 30" and the middle-diameter stepped portion 17 of the cylinder body 10X as described above, biases the irregular-shaped piston assembly 30" and the five stacked piston assemblies 30 in a direction away from the valve seat 75, which exerts no valve closing force on the diaphragm 75 (the inlet flow passage 71 and the outlet flow passage 72 are normally communicatively connected).

In either actuator, between any two adjacent stacked piston assemblies 30 inserted into the large constant diameter portion 13 of the cylinder body 10(10X), the axial rod 31*b* of the piston body 31 of one piston assembly 30 passes through the through-hole 32*d* of the partition 32 of the other piston assembly 30 so that the adjacent axial rods 31*b* come into mechanical contact with each other. In addition, the partitions 32 of any two adjacent stacked piston assemblies 30 (and the partition 32 of the irregular-shaped piston assembly 30' or the partition 32 of the irregular-shaped piston assembly 30" and the partition 32 of the adjacent stacked piston assembly 30) are in contact with each other when fitted into the large constant diameter portion 13 of the cylinder body 10(10X), thereby determining the axial positions of the partitions 32. An internal space that is defined by the pressure-receiving plate portion 31*a* and the axial rod 31*b* of the piston body 31, the slidable cylindrical guide portion 32*c* of the partition 32 and the small-diameter O-ring 34, and an internal space which is communicatively connected to the other internal space via the air introduction groove 31*g* and surrounded by the slidable cylindrical guide portion 31*c*, the base plate portion 32*a*, the large-diameter outermost cylindrical portion 32*b* and the large-diameter O-ring 33, constitute a pressure chamber P. In the multi-stacked piston assemblies 30 inserted into the large constant diameter portion 13, the axial rods 31*b* of the piston bodies 31 (the axial rod 31*b* and the pressure receiving plate portion 31*a*) of any two adjacent stacked piston assemblies 30 are in contact with each other, so that all the piston bodies 31 and the irregular-shaped piston bodies 31' (31") move simultaneously in the axial direction.

When the normally closed type multistage piston actuator 100 that is shown in FIG. 2 is in a state where the diaphragm 75 closes the flow passage with the force of the valve closing spring 50, supplying compressed air from an axial air passage 61 of the cap body 60 via a compressed air source 81, a regulator 82 and an on/off valve 83 causes an operating pressure to be exerted on the pressure chambers P via the axial air passage 31*d*, the air introduction groove 31*e* (and the push rod 22 and the air introduction groove 23) and the air introduction groove 31*g* of each of the stacked piston bodies 31 and of the irregular piston body 31', which causes each piston body 31 and the irregular-shaped piston body 31' to move against the biasing force of the valve closing spring 50; as a result, the diaphragm 75 is disengaged from the valve seat 74, which cause the inlet flow passage 71 and the outlet flow passage 72 to be communicatively connected to each other (the normally closed type on/off valve opens; the right cross section of FIG. 2).

Conversely, upon shutting off the supply of compressed air using the on/off valve 83, the force of the valve closing valve 50 causes each piston body 31 (the irregular-shaped piston body 31') to return to its original position, thus causing the diaphragm 75 to be seated onto the valve seat 74 to thereby cut off the communicative connection between the inlet flow passage 71 and the outlet flow passage 72 (the left cross section of FIG. 2). The air in the cylinder body 10 is discharged to the ambient air through the air vent groove 32*g* of each partition 32, each gap between the D-cut surface 32*f* and the cylinder body 10 and the exhaust hole 16.

When the multistage piston actuator 100X that is shown in FIG. 3 is in a state where the diaphragm 75 opens the flow passage with the force of the valve closing spring 50X, supplying compressed air from the axial air passage 61 of the cap body 60X via the compressed air source 81, the regulator 82 and the on/off valve 83 causes an operating pressure to be exerted on the pressure chambers P via the axial air passage 31*d*, the air introduction groove 31*e* and the air introduction groove 31*g* of each stacked piston body 31 and of the irregular piston body 31", which causes each piston body 31 and the irregular-shaped piston body 31" to move against the biasing force of the valve opening spring 50X; as a result, the push rod 20X presses the pusher 76 and the diaphragm 75 against the valve seat 74, thereby causing the diaphragm 75 to block the communication passage 73 between the inlet flow passage 71 and the outlet flow passage 72 (the normally open type on/off valve is closed; the left cross section of the FIG. 3).

Conversely, upon shutting off the supply of compressed air using the on/off valve 83, the force of the valve closing valve 50X causes each piston body 31 (the irregular-shaped piston body 31") to return to its original position, thus causing the diaphragm 75 to be disengaged from the valve seat 74 to make the inlet flow passage 71 and the outlet flow passage 72 communicably connected to each other (the right cross section of FIG. 3). The air in the cylinder body 10, except the pressure chamber P, is discharged to the ambient air through the air vent groove 32*g* of the partition 32, the gap between the D-cut surface 32*f* and the cylinder body 10 and the exhaust hole 16.

Even in the state where each piston body 31 and the associated partition 32 are spaced farthest from each other (the right cross section of FIG. 2/the left cross section of FIG. 3), the axial positions of the large-diameter O-ring 33 and the small-diameter O-ring 34 partially overlap each other (or contact each other), which reduces the axial length of each stacked piston assembly 30, so that the axial length has been reduced also in an operating state.

The output of the push rod 20(20X) can be varied according to the number of stages of the stacked piston assemblies 30 that are inserted into the cylinder body 10(10X) if the supply (compressed) air pressure is the same. As a matter of course, cylinder bodies 10 (10X) of different lengths are prepared and selectively used.

The multistage actuator according to the present invention is widely applicable to, e.g., normally open type on/off valves and normally closed type on/off valves which operate with air pressure.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A multistage piston actuator, comprising:
a cylinder body;
a plurality of piston bodies, which are fitted into said cylinder body; and
a push rod,
   wherein said multistage piston actuator exerts a driving pressure against a spring pressure into pressure chambers of said plurality of piston bodies to thereby operate said push rod,
wherein each of said plurality of piston bodies is combined with a partition which is fitted into said cylinder body, said pressure chambers being formed between said piston bodies and said partitions, respectively,
wherein each of said piston bodies includes a pressure receiving plate portion, and an axial rod and a slidable cylindrical guide portion which extend concentrically with an axis line in opposite directions from either side of said pressure receiving plate portion, said axial rod having an axial air passage that is communicably connected to said pressure chambers,
wherein each of said partitions includes a base plate portion having a through-hole which receives said axial rod of an adjacent piston body of said piston bodies, and a large-diameter outermost cylindrical portion and a slidable cylindrical guide portion which extend concentrically with said axis line from one side of said base plate portion, said large-diameter outermost cylindrical portion being fitted into said cylinder body, and said slidable cylindrical guide portion being slidably fit-engaged with said slidable cylindrical guide portion of an associated piston body of said piston bodies,
wherein a large-diameter sealing member is inserted in between an inner peripheral surface of said large-diameter outermost cylindrical portion and said base plate portion of said partition and said pressure receiving plate portion and an outer peripheral surface of said slidable cylindrical guide portion of said associated piston body,
wherein a small-diameter sealing member is inserted in between an inner peripheral surface of said slidable cylindrical guide portion and said base plate portion of said partition and an outer peripheral surface of said axial rod of said adjacent piston body,
wherein said slidable cylindrical guide portion of each piston body has a simple cylindrical shape, so that no groove having a U-shaped cross section for engaging said large-diameter sealing member is formed therein, and
wherein said axial rods of said plurality of piston bodies are mutually brought into mechanical contact to thereby operate said push rod.

2. The multistage piston actuator according to claim 1, wherein axial positions of said large-diameter sealing member and said small-diameter sealing member overlap each other at least when said associated piston body and said partition are positioned close to each other.

3. The multistage piston actuator according to claim 2, wherein said slidable cylindrical guide portion of said partition has a simple cylindrical shape, so that no groove having a U-shaped cross section for engaging said small-diameter sealing member is formed therein.

4. An on/off valve mechanism comprising said multistage piston actuator according to claim 2 and an on/off valve which includes a valve body that is opened and closed via said push rod of said multistage piston actuator.

5. The multistage piston actuator according to claim 1, wherein said slidable cylindrical guide portion of said partition has a simple cylindrical shape, so that no groove having a U-shaped cross section for engaging said small-diameter sealing member is formed therein.

6. An on/off valve mechanism comprising said multistage piston actuator according to claim 5 and an on/off valve which includes a valve body that is opened and closed via said push rod of said multistage piston actuator.

7. The multistage piston actuator according to claim 5, wherein said axial rod of each piston body has a simple rod shape, so that no groove having a U-shaped cross section for engaging said small-diameter sealing member is formed therein.

8. An on/off valve mechanism comprising said multistage piston actuator according to claim 7 and an on/off valve which includes a valve body that is opened and closed via said push rod of said multistage piston actuator.

9. An on/off valve mechanism comprising said multistage piston actuator according to claim 1 and an on/off valve which includes a valve body that is opened and closed via said push rod of said multistage piston actuator.

10. A multistage piston actuator, comprising:
a cylinder body;
a plurality of piston bodies, which are fitted into said cylinder body; and
a push rod,
wherein said multistage piston actuator exerts an operational pressure against a spring pressure into pressure chambers of said plurality of piston bodies to thereby operate said push rod,
   wherein each of said plurality of piston bodies is combined with a partition which is fitted into said cylinder body, said pressure chambers being formed between said piston bodies and said partitions, respectively,
   wherein each of said piston bodies includes a flat plate-shaped pressure receiving plate portion orthogonal to an axis line, and a simple rod-shaped axial rod and a simple cylinder-shaped slidable cylindrical guide portion which extend concentrically with said axis line in opposite directions from either side of said pressure receiving plate portion, said simple rod-shaped axial rod having an axial air passage that is communicably connected to said pressure chambers, wherein each said partitions includes a flat plate-shaped base plate portion that is orthogonal to said axis line and has a through-hole which receives said axial rod of an adjacent one of said piston bodies, and a large-diameter outermost cylindrical portion and a simple cylinder-shaped slidable cylindrical guide portion which extend concentrically with said axis line from one side of said base plate portion, said large-diameter outermost cylindrical portion being fitted into said cylinder body, and said simple cylinder-shaped slidable cylindrical guide portion being slidably fit-engaged with said slidable cylindrical guide portion of an associated piston body of said piston bodies, wherein a large-diameter O-ring is inserted in an annular space formed between an inner peripheral surface of said large-diameter outermost cylindrical portion and said flat plate-shaped base plate portion of said partition and said flat plate-shaped pressure receiving plate portion and an outer peripheral surface of said slidable cylindrical guide portion of said associated piston body, wherein a small-diameter O-ring is inserted in an annular space formed between an inner peripheral surface of said simple cylinder-shaped slidable cylindrical guide portion and said flat plate-shaped base plate portion of said partition and an outer peripheral surface of said simple rod-shaped axial rod of said piston body adjacent to said pressure receiving plate portion of said associated piston body, wherein axial positions of said large-diameter O-ring and said small-diameter O-ring overlap each other at least when said piston body and said partition are positioned close to each other, and wherein said axial rods of said plurality of piston bodies are mutually brought into mechanical contact to thereby operate said push rod.

11. An on/off valve mechanism comprising said multistage piston actuator according to claim 10 and an on/off valve which includes a valve body that is opened and closed via said push rod of said multistage piston actuator.

* * * * *